United States Patent
Weis et al.

(10) Patent No.: US 10,946,712 B2
(45) Date of Patent: Mar. 16, 2021

(54) METHOD FOR OPERATING A VEHICLE WITH A FUEL CELL UNIT

(71) Applicant: AUDI AG, Ingolstadt (DE)

(72) Inventors: Johannes Weis, Ingolstadt (DE);
Thomas Lichius, Gaimersheim (DE);
Thomas Weustenfeld, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 151 days.

(21) Appl. No.: 16/153,244

(22) Filed: Oct. 5, 2018

(65) Prior Publication Data

US 2019/0105961 A1  Apr. 11, 2019

(30) Foreign Application Priority Data

Oct. 5, 2017  (DE) ..................... 10 2017 217 714.4

(51) Int. Cl.
| | |
|---|---|
| *B60H 1/00* | (2006.01) |
| *B60L 58/33* | (2019.01) |
| *H01M 8/0438* | (2016.01) |
| *H01M 8/04007* | (2016.01) |
| *H01M 8/0432* | (2016.01) |
| *H01M 8/04746* | (2016.01) |
| *H01M 8/04029* | (2016.01) |
| *H01M 8/04701* | (2016.01) |

(52) U.S. Cl.
CPC .......... *B60H 1/00278* (2013.01); *B60L 58/33* (2019.02); *H01M 8/04029* (2013.01); *H01M 8/04052* (2013.01); *H01M 8/04067* (2013.01); *H01M 8/04358* (2013.01); *H01M 8/04417* (2013.01); *H01M 8/04701* (2013.01); *H01M 8/04768* (2013.01); *B60H 1/00885* (2013.01); *B60H 2001/00307* (2013.01); *H01M 2250/20* (2013.01)

(58) Field of Classification Search
None
See application file for complete search history.

(56) References Cited

U.S. PATENT DOCUMENTS

| | | | | |
|---|---|---|---|---|
| 2009/0311565 | A1* | 12/2009 | Ishikawa ........... | H01M 8/04126 429/413 |
| 2017/0036514 | A1* | 2/2017 | Umehara ........... | B60H 1/00385 |

FOREIGN PATENT DOCUMENTS

| | | |
|---|---|---|
| DE | 43 27 261 C1 | 10/1994 |
| DE | 11 2007 002 347 T5 | 7/2009 |
| DE | 10 2015 222 978 A1 | 5/2017 |
| JP | 2010-282808 A | 12/2010 |
| JP | 2011-189864 A | 9/2011 |

* cited by examiner

*Primary Examiner* — Wojciech Haske
(74) *Attorney, Agent, or Firm* — Seed Intellectual Property Law Group LLP

(57) ABSTRACT

A vehicle includes a fuel cell unit with which is associated a first coolant circuit, with a second coolant circuit associated with the interior of the vehicle, in which is held a coolant of lower temperature relative to the coolant of the first coolant circuit. Given higher demand for cooling capacity in the first coolant circuit, a valve is opened by a control device, independently of the heat demand in the second coolant circuit, to open a first connecting conduit between the first coolant circuit and the second coolant circuit, and thus, using a second connecting conduit, forms a common ring conduit for the first coolant circuit and the second coolant circuit with the accumulated coolant from the first coolant circuit and the second coolant circuit.

13 Claims, 1 Drawing Sheet

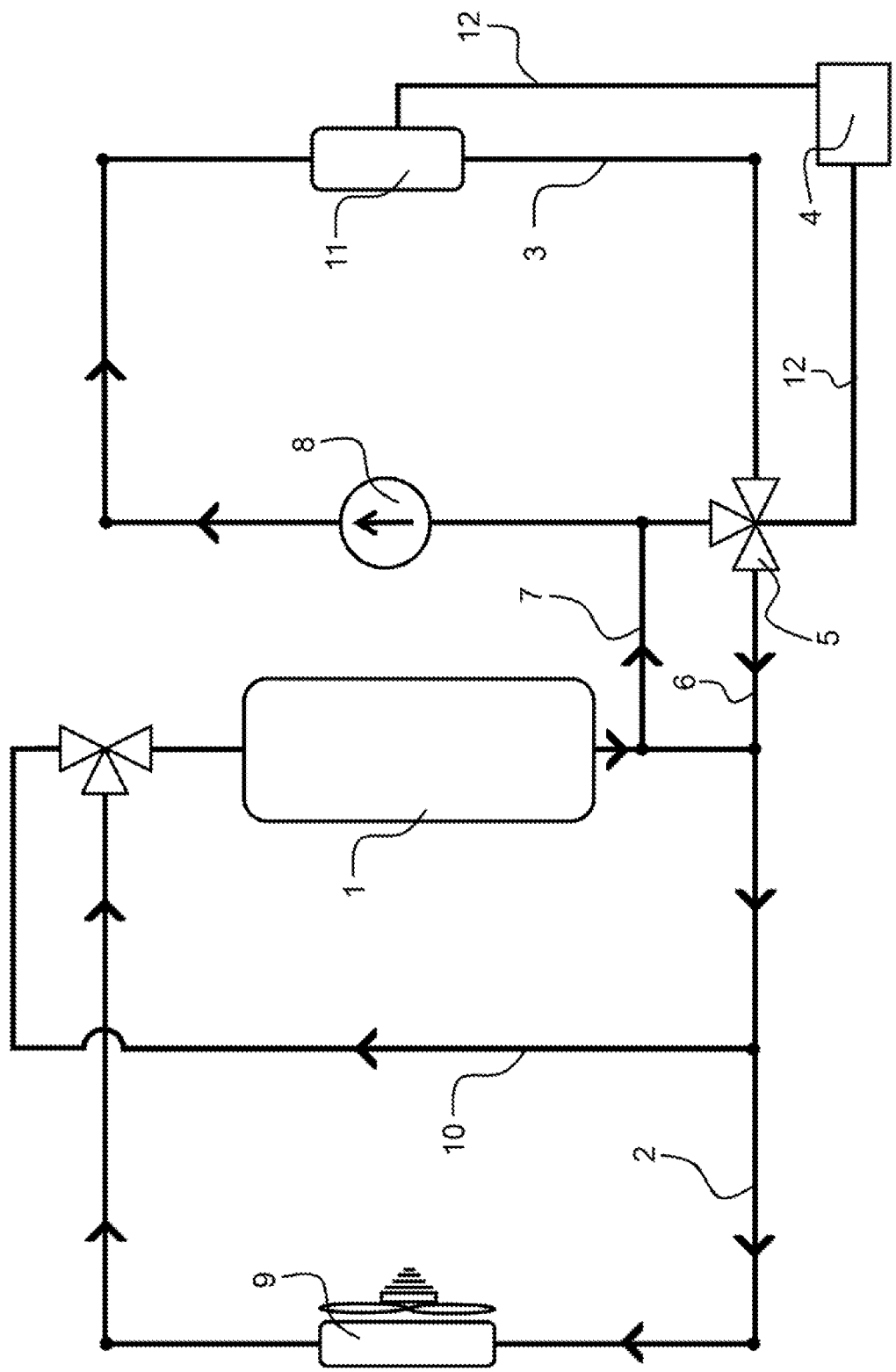

METHOD FOR OPERATING A VEHICLE WITH A FUEL CELL UNIT

BACKGROUND

Technical Field

The present disclosure relates to a method for operating a vehicle with a fuel cell unit with which is associated a first coolant circuit, with a second coolant circuit associated with the interior of the vehicle, in which is held a coolant of lower temperature relative to the coolant of the first coolant circuit.

Description of the Related Art

During their operation, fuel cell units produce heat that must be dissipated in a controlled manner if the heat production might lead to a temperature increase of the fuel cell unit beyond the optimal temperature interval for its operation. The first coolant circuit is provided for this. If the fuel cell unit is operated in a vehicle, the heat produced by the fuel cell unit may also be used in order to moderate the interior temperature. In DE43 27 261 C1, it is disclosed in this regard that the heat of the first coolant circuit may be delivered to the second coolant circuit via a heat exchanger.

DE10 2015 222 978 A1 discloses a vehicle in which a heat accumulator is arranged in the coolant circuit, in which heat accumulator are accommodated up to 100 liters of the coolant as a heat accumulator medium. This heat accumulator is used on the one hand in order to bring the fuel cell unit more quickly to operating temperature in the optimal temperature interval upon starting said fuel cell unit. On the other hand, the possibility also exists to discharge heat from the heat accumulator to the interior via the second coolant circuit if the vehicle is alternatively driven via a battery device instead of the fuel cell unit, in order to avoid too rapid a discharging of the battery device for heating requirements.

DE 11 2007 002 347 T5 discloses a vehicle with a climate control system, wherein a first cooling circuit and a second coolant circuit associated with the interior of the vehicle are provided in turn. According to the disclosure of this publication, a differentiation as to whether a cooling or a heating is desired is made via the climate control system. In the event of heating, by means of a valve the possibility is provided to make the coolant of the first coolant circuit available to the second coolant circuit so that, via an interior heat exchanger, the heat transported with the coolant of the first coolant circuit may be discharged to the interior if there is a need for heating.

BRIEF SUMMARY

Some embodiments of the invention are based on the object to further develop a method of the aforementioned type so that the efficiency of the first coolant circuit is improved.

This object is achieved in a method of the aforementioned type in that, given a higher demand for cooling capacity—in particular given a large power demand at the fuel cell unit—a valve in the first coolant circuit is opened by a control device to release a first connecting conduit between the first coolant circuit and the second coolant circuit, and thus a common ring conduit for the first coolant circuit and the second coolant circuit is formed, using a second connecting conduit, with the accumulated coolant from the first coolant circuit and the second coolant circuit.

This method offers the advantage that, given a large increase in the power demand, for example due to a strong acceleration by means of a kickdown, the cooling capacity demand may be produced without needing to dimension the first coolant circuit accordingly larger, because the possibility to establish a flow connection between the first coolant circuit and the second coolant circuit is utilized by opening the valve, and to also then charge the coolant of the second coolant circuit with heat if no heating requirement for the interior is present. By opening the valve, the quantity of the coolant available to the first coolant circuit is abruptly increased, wherein the coolant from the second coolant circuit has a lower temperature, approximately at the level of the environment.

Some embodiments of the invention recognize and utilizes that the greatest cooling problems in the first coolant circuit normally occur at high external temperatures, given which no heating demand exists for the second coolant circuit in the interior, but nevertheless the connection of the second coolant circuit with the first coolant circuit offers advantages because the heat capacity in the second coolant circuit may be utilized in order to attenuate thermal effects of dynamic load spikes. According to some embodiments of the invention, a cooling boost function for the first coolant circuit is therefore provided by integrating the second coolant circuit.

Within the scope of some embodiments of the invention, it is preferred that the heat transport between the first coolant circuit and the second coolant circuit takes place with the omission of a heat exchanger, via thermal convection with the accumulated coolant as a thermal transfer medium. The thermal transport mechanism of thermal convection from the first coolant circuit into the second coolant circuit is thus utilized so that a markedly smaller thermal inertia is present than given the heat exchanger known from the prior art, and therefore the suitability for a large load jump in the power demand results in a particular manner.

Within the scope of some embodiments of the invention, it is furthermore preferred that a coolant pump arranged in the second coolant circuit is activated by the control device upon opening the valve. Via this method step, the additional advantage is provided that the cool coolant of the second coolant circuit may be supplied more quickly to the first coolant circuit, and thus an overheating of the fuel cell unit is more effectively prevented.

Furthermore, it has proven to be advantageous if the pump capacity of the coolant pump is regulated by the control device depending on the power demand. On the one hand, the power consumption is thereby reduced, and on the other hand the available reserve is not too quickly depleted via possibly too strong a cooling of the fuel cell unit below the optimal temperature interval.

Since the advantages of the method according to some embodiments of the invention appear in particular at high external temperatures, it is normally unwanted that the heat carried with the accumulated coolant be discharged to the interior of the vehicle. This is prevented according to some embodiments of the invention. Rather, it is preferred that the valve is closed by the control device upon reduction of the cooling capacity demand in the first coolant circuit to build up a cooling reserve, and that the heat stored in the coolant of the second coolant circuit is discharged to the surroundings of the vehicle via use of a radiator and/or a heat exchanger. This avoids losses in comfort with the users in the interior of the vehicle, and simultaneously ensures that the cooling reserve may not only be provided once for the first increased power demand but rather always regenerates.

Furthermore, within the scope of some embodiments of the invention it is provided that a value regarding the power demand is supplied, via a signal conductor connected with the control device, to said control device as a parameter for the switching of the valve. Linked with this method step is the advantage that, not only is the capacity reserve provided by a temperature increase established by means of a temperature sensor, but rather the increase power demand may be detected via the changing of the position of the accelerator pedal, for example, in order to thus release the cooling reserves. It is thus advantageous that the value with regard to the power demand is correlated with the movement and/or the position of the accelerator pedal.

Furthermore, it is advantageous if, via evaluation of the temperatures of the coolant in the first coolant circuit and in the second coolant circuit by means of the control device, a signal is provided if a cooling reserve is available; the user of the vehicle is thus informed if the request for a greater power is possible without problems. Furthermore, it is advantageous if the signal provided by the control device regarding the level of the capacity reserve is used to limit the power demand such that every available cooling reserve may be requested, for example for overtaking maneuvers on highways or upon driving through a pass.

BRIEF DESCRIPTION OF THE SEVERAL VIEWS OF THE DRAWINGS

Additional advantages, features, and details result from the claims, the following description of preferred embodiments, and using the drawing. Shown are:

FIG. 1 illustrates an arrangement of a cooling system associated with a fuel cell unit.

DETAILED DESCRIPTION

Depicted in FIG. 1 is a fuel cell unit 1 with which is associated a first coolant circuit 2 in which coolant circulates that may be supplied to a radiator 9 in order to discharge to the environment heat arising during the operation of said fuel cell unit 1. This radiator 9 may be circumvented using an alternative path 10 in the first coolant circuit 2, for example if, at the beginning of the operation of the fuel cell unit 1, its temperature increase is desired until the optimal temperature interval is reached.

The shown fuel cell unit 1 is provided for operation of a vehicle that possesses an interior that must necessarily be heatable. Therefore, the first coolant circuit 2 is connected with a second coolant circuit 3 in which is provided a heat exchanger 11 for discharging heat carried in the second coolant circuit 3 to the interior. The connection of the first coolant circuit 2 with the second coolant circuit 3 takes place via a first connecting conduit 6, in which is positioned a valve 5 that in the closed state produces a separation of the two circuits, and in the opened state provides—via use of a second connecting conduit 7—a common circuit for the coolant from the first coolant circuit 2 and the second coolant circuit 3. A coolant pump 8 is associated with the second coolant circuit 3. Also present is a control device 4 that may be used to switch the valve 5 and/or the coolant pump 8.

With such a constructive design of the cooling and climate control system in a vehicle with a fuel cell unit 1, it is possible that—in particular given a large power demand at the fuel cell unit 1, and therefore given higher cooling capacity demand in the first coolant circuit 2—the valve 5 is opened by the control device 4 to open the first connecting conduit 6 between the first coolant circuit 2 and the second coolant circuit 3, and thus using the second connecting conduit 7 a common ring conduit is formed with the accumulated coolant from the first coolant circuit 2 and the second coolant circuit 3, such that the coolant of lower temperature that is standing ready in the second coolant circuit 3 may be used in order to provide a cooling boost function, and in fact independently of a heating demand actually present in the second coolant circuit 3 for the interior.

The thermal transport between the first coolant circuit 2 and the second coolant circuit 3 thereby takes place via thermal convection with the accumulated coolant as a thermal transfer medium, with the omission of a thermally more inert heat exchanger, such that a cooling reserve is abruptly provided upon opening the valve 5.

It is thereby provided that the coolant pump 8 arranged in the second coolant circuit 3 is activated by the control device 4 upon opening the valve 5. The pump capacity may thereby be regulated by the control device 4 depending on the power demand. Within the scope of some embodiments of the invention, with the interconnection depicted in the preceding the possibility also exists that a value regarding the power demand is supplied, via a signal conductor 12 connected with the control device 4, to said control device 4 as a parameter for the switching of the valve 5; the value regarding the power demand thus also correlates with the movement and/or position of the gas pedal.

The heat carried with the accumulated coolant should not be discharged to the interior of the vehicle, in particular given high external temperatures. So that the cooling reserve is not available for use only once, it is provided that the valve 5 is closed by the control device 4 upon reduction of the cooling capacity demand, and that the heat stored in the coolant of the second coolant circuit 3 is discharged to the surroundings of the vehicle via use of a radiator and/or a heat exchanger.

The possibility likewise exists that, via evaluation of the temperatures of the coolant in the first coolant circuit 2 and the second coolant circuit 3, a signal is provided by means of the control device 4 if a cooling reserve is available, or the signal provided by the control device 4 regarding the level of the capacity reserve is used to limit the power demand.

German patent application no. 102017217714.4, filed Oct. 5, 2018, to which this application claims priority, is hereby incorporated herein by reference, in its entirety. The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
    operating a vehicle, the vehicle including a fuel cell unit, an interior, a first coolant circuit for controlling a temperature of the fuel cell unit, and a second coolant circuit for controlling a temperature of the interior, wherein the first coolant circuit includes a first coolant having a first temperature and the second coolant circuit includes a second coolant having a second temperature that is lower than the first temperature;

wherein operating the vehicle includes, in response to a high cooling capacity demand in the first coolant circuit and independent of a heating demand in the second coolant circuit, operating a control device to open a valve to open a connecting conduit between the first coolant circuit and the second coolant circuit and form a common ring conduit including the first coolant circuit and the second coolant circuit.

2. The method according to claim 1, wherein heat transport between the first coolant circuit and the second coolant circuit takes place with the omission of a heat exchanger, via thermal convection with the first and second coolants as a thermal transfer medium.

3. The method according to claim 1 wherein a coolant pump is arranged in the second coolant circuit and the coolant pump is activated by the control device upon opening the valve.

4. The method according to claim 3, wherein operation of the coolant pump is regulated by the control device depending on a power demand.

5. The method according to claim 1, wherein heat carried by the first coolant is not discharged to the interior of the vehicle.

6. The method according to claim 1, wherein operating the vehicle includes, in response to a reduction in the cooling capacity demand in the first coolant circuit,
   operating the control device to close the valve to build up a cooling reserve; and
   discharging heat stored in the second coolant of the second coolant circuit to surroundings of the vehicle via use of a radiator or a heat exchanger.

7. The method according to claim 1, wherein a value regarding the power demand is supplied, via a signal conductor connected with the control device, to said control device as a parameter for switching of the valve.

8. The method according to claim 7, wherein the value regarding the power demand correlates with a movement or a position of an accelerator pedal.

9. The method according to claim 1, wherein, via evaluation of the first and second temperatures of the first and second coolants in the first and second coolant circuits, a signal is provided by the control device if a cooling reserve is available.

10. The method according to claim 9, wherein the signal provided by the control device regarding the cooling reserve is used to limit a power demand.

11. A vehicle, comprising:
   a fuel cell unit;
   an interior of the vehicle;
   a first coolant circuit configured to control a temperature of the fuel cell unit, the first coolant circuit including a first coolant having a first temperature;
   a second coolant circuit configured to control a temperature of the interior of the vehicle, the second coolant circuit including a second coolant having a second temperature that is lower than the first temperature;
   a connecting conduit that connects the first coolant circuit to the second coolant circuit;
   a valve within the connecting conduit that can be opened to open the connecting conduit and that can be closed to close the connecting conduit; and
   a controller configured to open the valve in response to a high cooling capacity demand in the first coolant circuit and independent of the heating demand in the second coolant circuit, to open the connecting conduit and form a common ring conduit including the first coolant circuit and the second coolant circuit.

12. The vehicle of claim 11 wherein the controller is configured to close the valve in response to a reduction in the cooling capacity demand in the first coolant circuit.

13. The vehicle of claim 11, further comprising a radiator or a heat exchanger configured to discharge heat from the second coolant to surroundings of the vehicle.

* * * * *